United States Patent
Goodfellow (10) Patent No.: US 6,363,202 B1
(45) Date of Patent: Mar. 26, 2002

(54) MANAGEMENT AND CONTROL OF THE POWER LEVELS OF WAVELENGTH MULTIPLEXED OPTICAL SIGNALS

(75) Inventor: Robert C Goodfellow, Northants (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/391,756

(22) Filed: Sep. 8, 1999

(30) Foreign Application Priority Data

Jun. 30, 1999 (GB) ............................................. 9915234
Aug. 10, 1999 (GB) ............................................. 9918723

(51) Int. Cl.[7] ............................ G02B 6/00; G02B 6/26; G02B 6/42
(52) U.S. Cl. .......................................... 385/140; 385/24
(58) Field of Search .................. 385/24, 140; 250/226; 359/127

(56) References Cited

U.S. PATENT DOCUMENTS

| | | | | |
|---|---|---|---|---|
| 5,425,116 A | * | 6/1995 | Dragone et al. | ............... 385/24 |
| 5,841,918 A | * | 11/1998 | Li | ............................... 385/24 |
| 6,057,959 A | * | 5/2000 | Taylor et al. | ................ 359/341 |
| 6,134,034 A | * | 10/2000 | Terahara | ..................... 359/124 |
| 6,157,481 A | * | 12/2000 | Sugaya et al. | .............. 359/337 |
| 6,173,094 B1 | * | 1/2001 | Bowerman et al. | ........... 385/24 |

OTHER PUBLICATIONS

Highly Stable Optical Add/Drop Multiplexer Using Polarization Beam Splitters and Fiber Bragg Gratings, Se Yoon Kim, et al., IEEE Photonics Technology Letters, vol. 9, No. 8, Aug. 1997, pp. 1119–01121.
An All–Fier Dense–Wavelength–Division Multiplexer/Demultiplexer using Photoimprinted Bragg Gratings, F. Bilodeau, et al., IEEE Photonics Technology Letters, vol. 7, No. 4, Apr. 1995, pp. 388–390.
Fibre gratings unlock the broadband futureI, Components & Systems, Oct. 1991, FibreSystems, pp. 17–20.

* cited by examiner

Primary Examiner—Ricky Mack
(74) Attorney, Agent, or Firm—Kirschstein, et al.

(57) ABSTRACT

A system for individually controlling the power levels of a plurality of wavelength division multiplexed (WDM) optical signals in a single optical guide comprising a first plurality of individually controllable optical attenuators. An example of a suitable optical attenuator is a tunable fiber Bragg grating filter whose reflectivity characteristic varies with wavelength over an active region thereof. By tuning the filter, it is possible to control the reflectivity at a particular wavelength in the active region. The system may, in addition, comprise a second plurality of optical attenuators arranged so as to compensate for any power level distortion introduced by the first plurality. Optical circulators may be used to route signals into and between the pluralities of optical attenuators.

29 Claims, 5 Drawing Sheets

MANAGEMENT AND CONTROL OF THE POWER LEVELS OF WAVELENGTH MULTIPLEXED OPTICAL SIGNALS

BACKGROUND OF THE INVENTION

The invention relates to the field of wavelength multiplexed optical communications systems, such as wavelength division multiplexed (WDM) systems, and more particularly to the management and control of the power level of wavelength multiplexed optical signals.

Optical communications systems are a substantial and fast-growing constituent of communications networks. The expression "optical communications system@, as used herein, relates to any system which uses optical signals to convey information across an optical medium. Such optical systems include, but are not limited to, telecommunications systems, cable television systems and local area networks (LANs). Optical systems are described in Gower, Ed. *Optical Communications Systems,* (Prentice Hall, N.Y.). Currently, the majority of optical communication systems are configured to carry a single optical channel having a narrow wavelength spectral band over one or more optical waveguides. To convey information from a plurality of sources, wavelength division multiplexing (WDM) is now used. In a WDM system a plurality of optical signals, each typically having a narrow wavelength spectral band, each band being centered on a different wavelength, are carried over a single optical guide.

A typical optical network comprises a plurality of nodes linked by a number of different optical paths for the carriage of WDM signals therebetween. Typically, each path will introduce a different amount of attenuation into the signal components passing through it.

One problem experienced in optical communication systems is the wide variation in the attenuation experienced by optical signals following different routes through the network. This leads to a corresponding variation in the power levels of different signals arriving at a particular node in an optical network via different routes. Such variation is experienced even with signals originating from the same point in the network with nominally identical power levels, but following different paths between nodes. In order to overcome this problem there is a need for a means to selectively attenuate optical signals arriving at a point in the network.

A prior art method for applying a different attenuation to each WDM signal arriving at a certain node in an optical network has been to demultiplex all of the channels onto separate paths by means of a wavelength demultiplexer using interferometers, diffraction gratings or waveguide phasor devices to insert waveguide attenuators into each of the separate paths, (thus allowing for each channel to be attenuated independently of the others) and to then recombine all of the channels using a multiplexer of similar principle to that of the demultiplexer. This method has the disadvantage that it involves significant insertion loss in the optical path because of the number of components required. The component parts and the assembly required by this method results in a high cost and a complexity that increase with the number of channels.

SUMMARY OF THE INVENTION

The present invention provides a system for controlling the power levels of a first plurality of optical signals in a first optical path; in which the optical signals are spectrally separated; in which the, optical path comprises optical attenuation means comprising a first plurality of variable optical attenuators, each optical attenuator for attenuating in a different part of the spectrum.

In a preferred embodiment, the present invention provides a system comprising a second optical path, the system for also controlling the power levels of a second plurality of optical signals in the second optical path; in which the second plurality of optical signals form a set with the first plurality of optical signals, and in which the optical signals of the set are spectrally separated; in which the second optical path comprises a second plurality of optical attenuators and in which the second plurality of optical attenuators form a set with the first plurality of optical attenuators of, each optical attenuator of the set for attenuating in a different part of the spectrum; in which, in part, the first and second paths share a first optical guide; in which the system comprises an interferometer for separating the second plurality of optical signals in the shared part of the first optical guide into a second optical guide of the second path; in which the first and second optical guides comprise the first and second pluralities of optical attenuators respectively.

In a further preferred embodiment, the present invention provides a system in which the optical attenuation means comprises a further plurality of optical attenuators each optical attenuator of the further plurality for attenuating a different part of the spectrum; each optical attenuator of the further plurality for attenuating the same part of the spectrum as, and comprised in the same path as, a corresponding optical attenuator of the first plurality.

In a further preferred embodiment, the present invention provides a system for selectively delaying components of an optical signal according to the wavelengths of the components.

BRIEF DESCRIPTION OF THE DRAWINGS

Embodiments of the present invention will now be described by way of example with reference to the drawings in which.

DETAILED DESCRIPTION OF THE PREFERRED EMBODIMENTS

Figure 1:
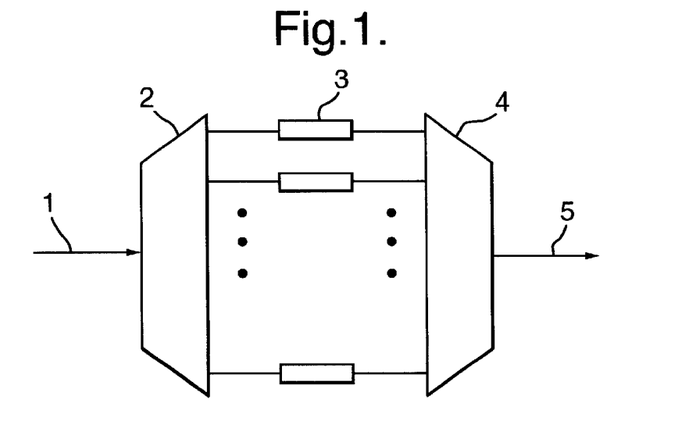
FIG. 1 shows a diagram of an optical attenuator system of the prior art.

An optical attenuator system of the prior art will first be described in more detail with reference to FIG. 1.

Signals input to the attenuator via optical guide 1 encounter wavelength de-multiplexer 2 of a known type using interferometers, diffraction gratings or waveguide phasor devices which acts to separate the incoming optical signals according to their wavelength and outputs each different optical signal via a different one of a plurality of output ports. Each output port of de-multiplexer 2 is connected via an optical guide to one of plurality of optical attenuators 3. The optical attenuators may be implemented as an unbalanced Mach Zehnder waveguide in polymer waveguides, silica on silicon waveguides, Group III-V material waveguides and silicon waveguides, and the attenuation may be varied by altering the refractive index differentially in the arms of the interferometer by heat or biassing in the semiconductor waveguide case. Each optical attenuator may have its attenuation adjusted such that each signal passing through the selective attenuator may experience a different amount of attenuation such that the signals leaving the plurality of attenuators share a common power level. On leaving the plurality of attenuators 3 the optical signals are guided via optical guides into multiple input ports of optical multiplexer 4 operating on a similar principle to optical de-multiplexer 2. Optical multiplexer 4 acts to combine all of the input optical signals onto single output optical guide 5.

Figure 2A:
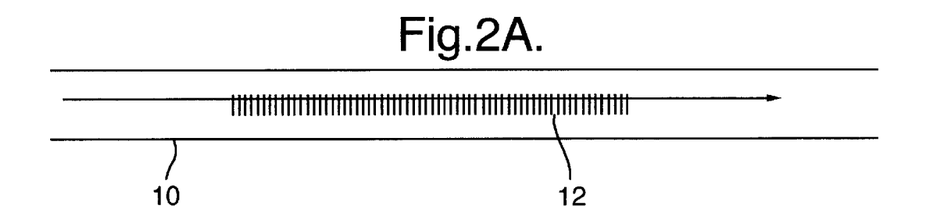
FIG. 2 shows in cross-section an optical fibre and a fibre Bragg Grating of the prior art.
Figure 2B:
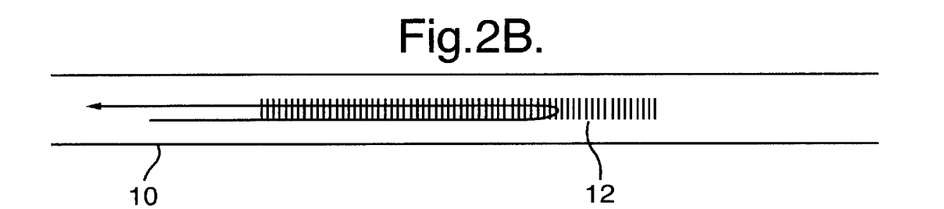

FIG. 2 shows a fibre Bragg Grating consisting of an optical fibre 10 in which a series of variations (represented diagrammatically by lines 12) in the refractive index of the material (e.g. glass) of the optical fibre are formed. The lines form a diffraction grating that acts to pass incident radiation of most wavelengths (as represented by the arrow of FIG. 2a) and to reflect incident radiation of particular wavelengths (as represented by the arrow of FIG. 2b), depending on the spacing or period of the lines of optical guide variation. The term "spacing" as used here refers to the effective period "s" of the optical grating that depends on the actual spacing in combination with other characteristics, most notably the refractive index of the optical guide medium. By "variations in the refractive index" we are referring to the degree of change of the refractive index of the grating medium at each line of the grating. The greater the local variation of refractive index (denoted Δn) the greater proportion of the signal that will be reflected at that position (i.e. at that line). Here the term 'grating' refers to a periodic perturbation to the optical guide (used in a broad sense to include wave guides and optical fibres) properties, that results in a wavelength selective response. The perturbation can be to any parameter of the optical guide that influences the propagation of the light guided through the structure, and includes variations in refractive index and physical shape. Light can only travel in an optical guide in a particular propagation mode, and the effect of the grating will depend on which mode the light is in. Hence to determine the effect of the grating, one must know the 'effective refractive index' seen by the specific guided mode being propagated. This allows the 'effective period' of the grating to be defined for a particular guided mode.

An alternative form of optical filter comprises multi-layer dielectric filters acting as selectively reflective mirrors. In practice a plurality of optical filters may be arranged in series with each successive filter active in a different part of the spectrum. Typically, light reflected by a first multi-layer dielectric filter will become incident on the next multi-layer dielectric filter in the series, whereas light passed by a first FBG filter will become incident on the next FBG filter in the series.

Figure 3:
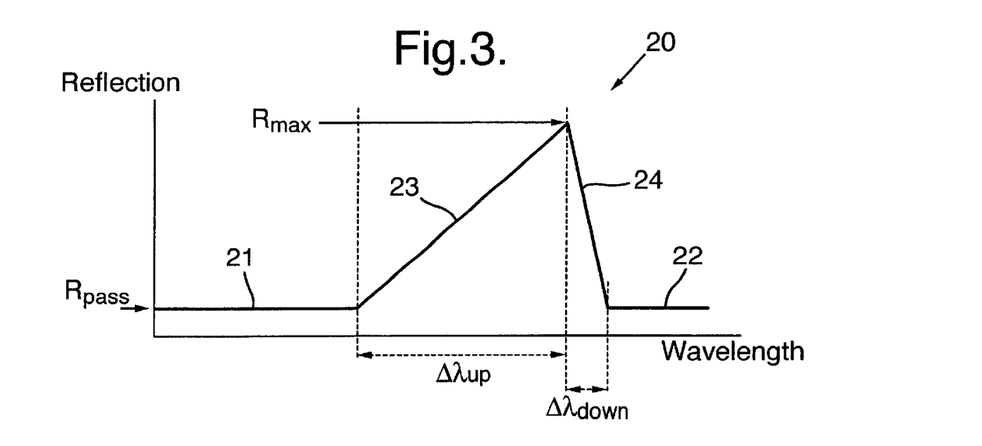
FIG. 3 shows the reflectivity characteristic of a variable optical attenuator according to the present invention.

A reflectivity characteristic of a variable optical attenuator according to the present invention is shown in FIG. 3. A variable optical attenuator according to the present invention may advantageously comprise a tunable optical filter of a type described above. FIG. 3 shows reflectivity characteristic line 20 that indicates the way the reflectivity of the filter varies with the wavelength of incident light. The term light is used here without implying restriction to visible radiation but extends to radiation of any suitable wavelength. In the pass band represented by line segments 21 and 22 the filter acts to pass nearly all the incident radiation; the reflectivity of the filter being at a relatively low level ($R_{pass}$). Between the lower pass band 21 and the upper pass band 22 lies the reflection band represented by line segments 23 and 24. Line segment 23 shows an increase in reflectivity with increasing wavelength from the passband value $R_{pass}$ up to a maximum value $R_{max}$. This line segment 23 constitutes the active region of the filter characteristic, i.e that part used to selectively attenuate optical signals. As shown in FIG. 3, line segment 23 has a substantially constant gradient. Continuing in the direction of increasing wavelength from the maximum value $R_{max}$, line segment 24 shows a rapidly decreasing value of reflectivity back to the passband value $R_{pass}$. The gradient of reflection band characteristic line segment 23 is smaller than that of reflection band characteristic line segment 24 so that the wavelength span $\Delta\lambda_{up}$ over which line segment 23 extends in climbing from the $R_{pass}$ value to the $R_{max}$ value is significantly greater than the wavelength span $\Delta\lambda_{down}$ covered by line segment 24 in returning from the $R_{max}$ value to the $R_{pass}$ value. Hence, the filter characteristic of FIG. 3 exhibits a generally ramped (or triangular) reflectivity profile. Advantageously, the filter will be formed in low loss fibre and designed for low transmission loss ($\alpha_{thru}$). This low transmission loss is important where a number of such filters are connected in series. Suitable characteristics for a fibre Bragg grating filter of ramped reflection profile are as given in Table 1.

TABLE 1

| Parameter | | Target | Max | Min | |
|---|---|---|---|---|---|
| No of FBG | n | 8, 16 ... 128 ... | | | |
| Length of a FBG | $L_g$ | 15 mm | 20 mm | 5 mm | |
| Spacing of FBG centres | $L_p$ | 220 mm | | | fixed by bend radius for long life |
| 100 GHz spaced ITU grid λ1545 nm | $\lambda_{centre}$ | ITU | +25 GHz | −25 GHz | |
| Refl. rise | $\Delta\lambda_{up}$ | 50 GHz | 70 GHz | 20 GHz | |

TABLE 1-continued

| Parameter | | Target | Max | Min |
|---|---|---|---|---|
| Refl. fall | $\Delta\lambda_{down}$ | 5 GHz | 10 GHz | 0 GHz |
| Peak reflection | $R_{max1}$ | 90% | 99% | 80% |
| Chain loss in pass bands | $\alpha_{thru=}$ | <−0.5 dB | 1 dB | |
| Core size | | | | Large preferred |

Suitable filters could, for example, be implemented in optical guides (by which is meant optical fibres or waveguides) formed in silica, silicon, a group III-V alloy or polymer and the filtering achieved by forming a phased grating by etching, embossing, exposure to ultra-violet radiation using holography or with a phase mask or aperture mask. Each type of filter has the ability to be tuned, i.e. the spectral position of the reflection band may be shifted to higher or lower wavelengths by applying a stimulus to the filter. This stimulus could, for example, be electrical, mechanical or thermal.

In more detail, tuning of the filter may be achieved by depleting charge from the region of the grating or by injecting an electronic charge so as to change the complex refractive index of the filter, by varying the strain applied by means of a piezo or magneto strictive actuator or by varying the temperature of the filter by means of a heater or cooler.

Figure 4:
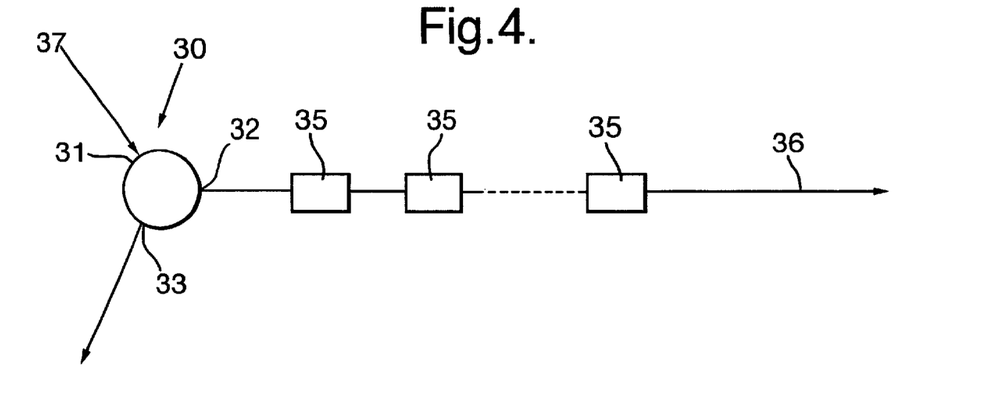
FIG. 4 shows a first system for use of a variable optical attenuator according to the present invention.

A system for individually controlling the power levels of a plurality of optical signals, each signal allocated to a different part of the spectrum, e.g. wavelength division multiplex (WDM) signals, in a single optical guide will now be described with reference to FIG. 4. The "selective attenuator" system of FIG. 4 comprises optical circulator 30 which is provided with three ports, input port 31, filter port 32, and dump port 33. A number of WDM optical signals 37 are input at port 31 of the optical circulator. Filter port 32 is connected to a plurality of tunable ramped profile optical filters 35 (as, for example, described above) connected in series in a suitable optical guide 36. In an alternative embodiment (not shown) optical circulator 30 may be replaced by an optical isolator arranged with plurality of WDM optical signals 37 connected to the input and plurality of tunable ramped profile optical filters 35 connected in series in optical guide 36 to the output thereof. As before, each of tunable ramped profile filters 35 has a reflection band corresponding to a different one of the plurality of input signals 37. Each of the tunable ramped profile filters is individually tunable, as described above, and appropriate control means are provided to control the tuning of each filter on an individual basis, e.g. by applying the appropriate level of stimulus to each one.

The operation of the system of FIG. 4 will now be described. Input optical signals 37 pass through the circulator from port 31 to emerge at port 32 thereof. The optical signals then pass along optical guide 36 and encounter the series of tunable ramped profile optical filters 35. Each of the plurality of filters 35 has a reflection band corresponding to the wavelength of a particular one of the optical signals 37. This means that each input signal will pass through all but one of the optical filters 35 virtually unchanged. Upon reaching the optical filter 35 whose active region corresponds to the wavelength band of that signal, the signal will experience a reflection the magnitude of which will depend on the tuning of the filter. This reflection effects an attenuation of the incident signal. If the filter is in the un-tuned state, the input signal will experience a "normal" level of reflection (say 50% of the input signal) corresponding to the reflectivity of the filter at a point approximately half-way up the active region line segment 23. However, if it is determined that a particular signal requires 10% more attenuation compared with the "normal" level, e.g. if the power level of that particular input signal is 10% higher than the desired level, the relevant filter may be tuned such that the active region is shifted in the direction of decreasing wavelength by an amount such that the reflectivity at the wavelengths corresponding to the particular input signal is increased by an appropriate amount to reduce the incident signal power level by an extra 10% compared with the norm. As a result, the input signal will experience a larger reflection than normal and the magnitude of the signal transmitted by that filter will be correspondingly lower. Alternatively, if it is determined that a particular signal requires less attenuation compared with the "normal level", e.g. if the magnitude of the input signal is determined to be relatively low then the filter may be tuned such that the active region of the filter is shifted in the direction of increasing wavelength such that the reflectivity of the filter at the wavelengths corresponding to the input signal is lower than the normal value by an appropriate amount. This will result in less of the signal being reflected in the filter so that the signal transmitted by that filter will have a higher power level than the power level it would have if the filter had been left in the un-tuned state. In the extreme case, for a sufficiently small signal, the filter may be tuned so that effectively no attenuation is applied to that signal. Hence the arrangement of FIG. 4 may be used to transform a plurality of input signals of varying power level into output signals of uniform power level.

The portions of the input signals reflected by the plurality of filters 35 return via optical guide 36 to optical circulator 30, to re-enter optical circulator 30 at port 32 thereof and pass through the optical circulator to emerge at port 33 thereof where they are effectively discarded. The portions of the optical input signals 37 passed by the series of optical filters 35 will continue along optical guide 36 in the direction away from optical circulator 30 and are thus output from the selective attenuator.

According to the alternative embodiment (not shown) described above and comprising an optical isolator in place of the optical circulator, the portions of the input signals reflected by the plurality of filters 35 return via optical guide 36 to the optical isolator (not shown), to re-enter optical isolator at the output thereof and are effectively discarded by being dispersed within the optical isolator.

Alternatively, according to a further preferred embodiment, the output may be obtained from the signals reflected at the plurality of filters 35. In this case reduced attenuation of the incident signal is obtained by tuning the relevant filter such that the active region is shifted in the direction of decreasing wavelength such that the reflectivity at the wavelengths corresponding to the particular input signal is increased. Conversely, increased attenuation of the incident signal is obtained by tuning the relevant filter such that the active region is shifted in the direction of increasing wavelength such that the reflectivity at the wavelengths corresponding to the particular input signal is decreased. In this embodiment the portions of the input signals passed by the plurality of filters 35 continue along optical guide 36 in the direction away from optical circulator 30 and may effectively be discarded. The portions of the incident signals reflected by plurality of filters 35 are output at port 33 of optical circulator 30.

Figure 5:
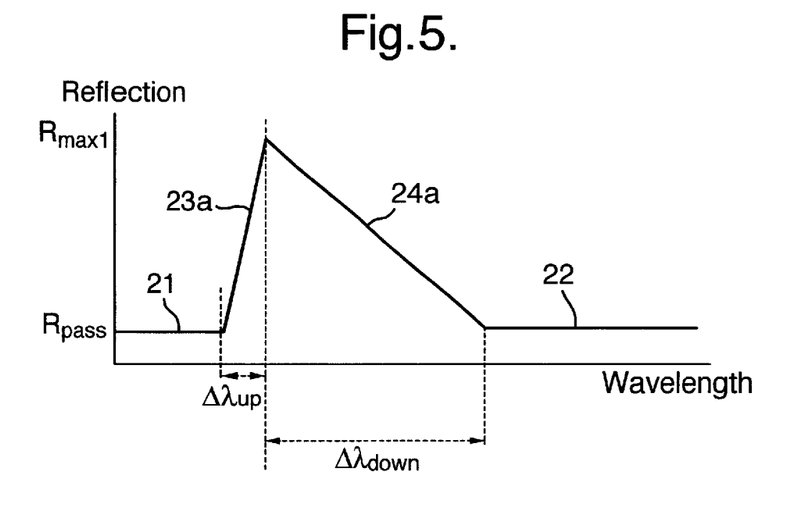
FIG. 5 shows the reflectivity characteristics of a second variable optical attenuator according to the present invention.

The gradient of the active region of the filters of the above system could be positive or negative, as illustrated in FIG. 3 and FIG. 5 (described below). If negative, shifts in the characteristic to achieve a particular change in reflectivity, described above in relation to a filter of positive gradient, will be carried out in the reverse direction to that described there.

The optical signals used in optical communications networks typically comprise side-lobes spectrally spaced from a central peak. Use of the ramped profile filter of the first embodiment, described above, inevitably results in a different level of attenuation being applied to the spectrally spaced side-lobes. As the two side-lobes will be affected by different regions of the relevant reflectivity characteristic, distortion of the power level across the signal waveband is introduced. If it is important that the side-lobes, or the spectral profile of the optical signals, is not distorted in this way, a second series of ramped profile filters may be added, as described next.

A reflectivity characteristic of a second variable optical attenuator according to the present invention is shown in FIG. 5. Again, a variable optical attenuator according to the present invention may advantageously comprise a tunable optical filter of a type described above. The second variable optical attenuator differs from the first variable optical attenuator of FIG. 3 in its reflectivity characteristic: the characteristic of the second attenuator appearing as a "mirror image" of that of the first attenuator. The reflectivity characteristic of the second attenuator of FIG. 5 thus features lower and upper pass bands 21, 22 (corresponding to reflectivity value $R_{pass}$) and in the reflection band, a line segment 23a representing a rapid increase in reflectivity with increasing wavelength from the passband value $R_{pass}$ to a maximum value $R_{max}$ and, continuing in the direction of increasing wavelength, a second line segment 24a in the reflection band indicating a more slowly declining value of reflectivity with increasing wavelength from the value $R_{max}$ back to the value $R_{pass}$. This second, slowly declining line segment 24a constitutes the active region of the attenuator characteristic, i.e that part used to selectively attenuate optical signals. This line segment 24a has a substantially constant gradient of opposite sign to the gradient of the active region (i.e. line segment 23) of the attenuator of FIG. 3. Ideally the magnitudes of the gradients of the two line segments constituting the respective active regions will be equal.

A second selective attenuator system (not shown) according to the present invention will now be described. This second system comprises the arrangement of FIG. 4 combined with a second series of optical filters (not shown) connected via an optical isolator or optical circulator in series with the first series described above with reference to FIG. 4. This second series comprises optical filters having a reflectivity characteristic gradient in the active region of opposite sign to the corresponding gradient of the optical filters of the first series, i.e. with a reflectivity characteristic appearing as a mirror image of that of filters 35 of the first series.

In operation, in the second selective attenuator system, each signal passing through the selective attenuator system will pass through both series of filters, and will experience partial reflection in one filter 35 from the first series and one filter from the second series. The power level distortion introduced by the filter 35 of the first series hence being compensated for by the corresponding filter of the second series.

In an alternative embodiment, some or all of the filters 35 of the first series could exhibit the reflectivity characteristic of FIG. 5 whilst the corresponding filters of the second series exhibit the reflectivity characteristic of FIG. 3.

Figure 6:
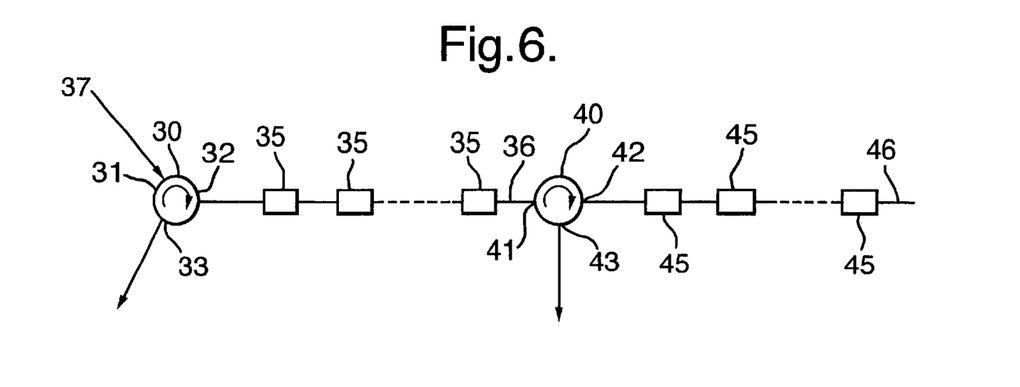
FIG. 6 shows a further system for use of a variable optical attenuator selective attenuator according to the present invention.

FIG. 6 shows a third selective attenuator system according to the present invention. Features common to FIG. 4 are given the same reference numerals and will not be further described here. The selective attenuator of FIG. 6 comprises a second optical circulator 40 and a second plurality of optical filters 45 connected in series by means of an optical guide 46. Second optical circulator 40 comprises three ports 41 to 43. The signals output from (i.e. passed by) the first series of optical attenuators 35 via optical guide 36 are input to second optical circulator 40 at port 41 thereof. These signals pass through the optical circulator to emerge at port 42 thereof from where they pass via optical guide 46 and encounter series of optical filters 45.

In an alternative embodiment (not shown) optical circulator 40 may be replaced by an optical isolator arranged with the signals output from the first series of optical attenuators 35 via optical guide 36 connected to the input and plurality of optical filters 45 connected in series in optical guide 46 to the output.

Unlike the second series of filters of the second selective attenuator system described above, the filters 45 have a similar reflectivity characteristic to the filters 35 of the first series and may advantageously be of the same type. In particular, the gradients of the reflectivity characteristics in the active regions have the same sign. Furthermore, unlike the arrangement of the second system, the output signal in the arrangement of FIG. 5 is derived from the portions of the input optical signals reflected by second series of filters 45. These reflected signals pass back along optical guides 46 to re-enter optical circulator 40 at port 42 thereof, then pass through optical circulator 40 to emerge at port 43 thereof and are thus output from the selective attenuator. The unwanted portions of the input signals passed by series of optical filters 45 continue along optical guide 46 to the end thereof away from optical circulator 40 where they may be discarded.

Figure 7:
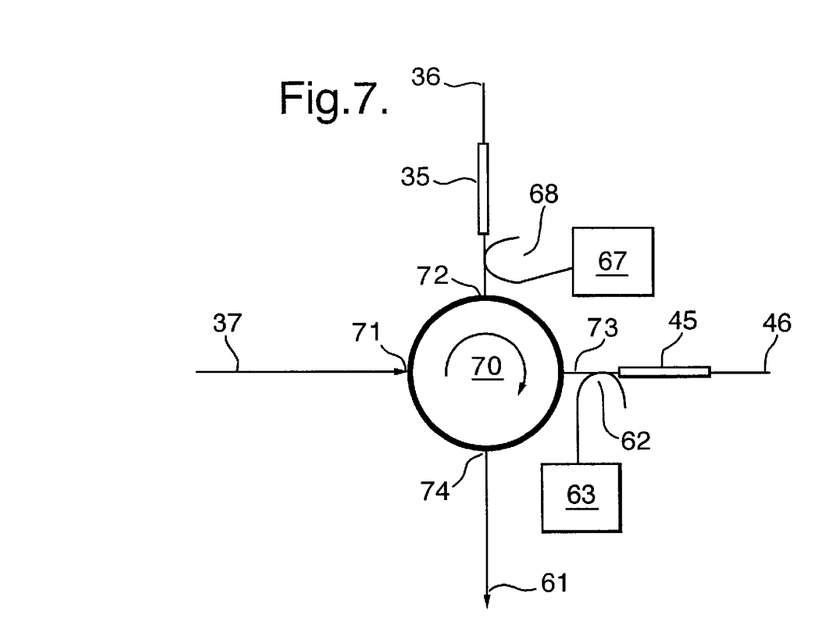
FIG. 7 shows a further system for use of a variable optical attenuator according to the present invention.

A fourth selective attenuator system according to the present invention is illustrated in FIG. 7. According to the system of FIG. 7, the output may be obtained from the signals reflected at both the plurality of filters 35 and 45 in turn. The fourth selective attenuator system of FIG. 7 comprises optical circulator 70 which is provided with four ports, input port 71, first filter port 72, second filter port 73 and output port 74. WDM optical signals 37 are input at port 71 of the optical circulator 70. First filter port 72 is connected to plurality of optical filters 35 in optical guide 36. Second filter port 73 is connected to second plurality of optical filters 45 in optical guide 46. The portions of the input signals reflected by the plurality of filters 35 back to port 72 of optical circulator 70 emerge at port 73 thereof and then pass along optical guide 46 and encounter the plurality of optical filters 45. The portions of input signals 37 reflected by the plurality of filters 45 return via optical guide 46 to re-enter the optical circulator 70 at port 73 thereof and pass through the optical circulator to emerge at port 74 thereof where they are output.

Figure 8:
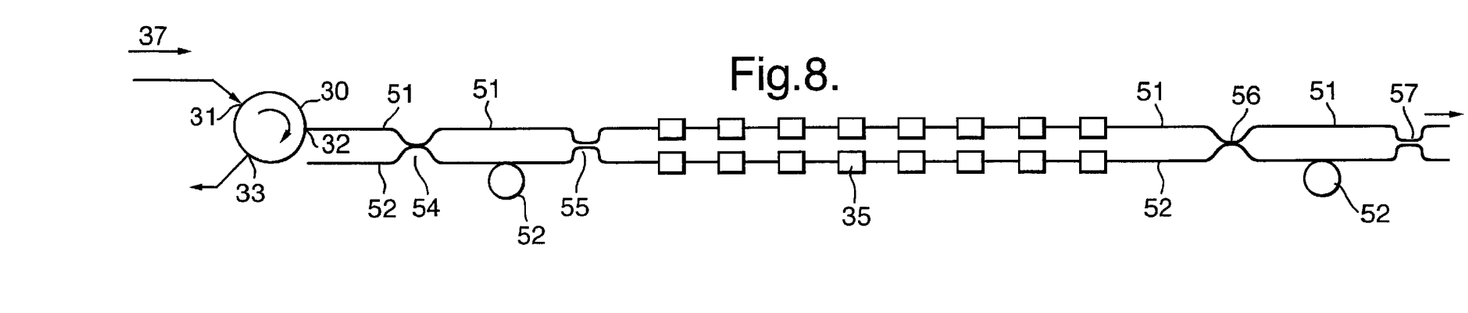
FIG. 8 shows a further system for use of a variable optical attenuator according to the present invention.

A fifth selective attenuator according to the present invention is illustrated in FIG. 8. Features of FIG. 8 which are common with earlier Figures are given the same reference numerals and will not be described further here. Comparing the arrangement of FIG. 8 with that of FIG. 4, input signals 37 output from optical circulator 30 at port 32 thereof pass along optical guide 51 to Mach-Zehnder interferometer (or interference filter) 54, 55. The interferometer comprises optical guide 51 combined with a second optical guide 52 which are brought into contact at points 54 and 55 leading to a sharing of optical input signals 37 between the two optical guides. Each of optical guides 51, 52 continue separately from contact point 55, each continuation containing a different set of filters 35 corresponding to the filters of the first series, i.e. as described with reference to FIG. 3. As is known in the prior art, the length of optical guide 51 between contact points 54 and 55 is arranged to be slightly different from the length of optical guide 52 between the same two points of contact. This difference results in two modes of interaction at contact point 55 between the parts of input signals 37 travelling via optical guide 51 and the parts travelling via optical guide 52. Depending on the wavelength of a particular optical signal the two parts of each particular signal will have a particular phase relationship at contact point 55 resulting in that particular signal continuing along either optical guide 51 or optical guide 52 so as to enter one or other set of optical filters 35.

The first Mach-Zehnder interferometer 54, 55 is connected via the continuation of optical guides 51 and 52 and the optical filters 35 to a second, similar interferometer 56, 57. The second Mach-Zehnder interferometer 56, 57 comprises two points of contact 56, 57 between optical guides 51, 52, the lengths of optical guides 51, 52 between points of contact 56, 57 being arranged so that all input signals 37 are output on the optical guide of choice, e.g. optical guide 51.

As described above, two separate paths are established between the first and second interferometers 54, 55 and 56, 57, i.e. a first path via optical guide 51 and a second path via optical guide 52 each of these paths comprising a different series of optical filters 35. The first set of optical filters 35 i.e. those in optical guide 51 are arranged to selectively reflect a first set of signals from input signals 37 whereas the second set of optical filters 35, i.e. those in optical guide 52 are arranged to selectively reflect a second set of signals from input signals 37, this second set comprising all of the signals not included in the first set.

Advantageously the two sets of signals could be arranged such that spectrally adjacent signals do not belong to the same set so that the spectral spacing of signals of a particular set are twice that of the input signals 37 as a whole. This arrangement advantageously results in reduced cross-talk.

Advantageously, in a sixth selective attenuator system according to the present invention (not shown), third and fourth sets of filters (not shown) are added to the arrangement of FIG. 7 with the third set connected via an optical isolator or circulator (not shown) in series with the first set and with the fourth set connected via an optical isolator or circulator (not shown), in series with the second set, each of the third and fourth sets comprising filters of the type described above with reference to FIG. 5, i.e. corresponding to filters of the second series.

In operation, in the sixth system, each signal passing through the selective attenuator system will pass through filters from both series, and will experience partial reflection in one filter 35 from the first series (i.e. with an active region gradient of a first sign) and one filter from the second series (i.e. with an active region gradient of opposite sign), the power level distortion introduced by the filter 35 of the first series hence being compensated for by the corresponding filter of the second series.

In a variant of the sixth selective attenuator system, some or all of the filters 35 of the first and second sets could exhibit the reflectivity characteristic of FIG. 5 whilst the corresponding filters of the third and fourth sets exhibit the reflectivity characteristic of FIG. 3.

Alternatively, in a seventh selective attenuator system according to the present invention (not shown), third and fourth sets of filters (not shown) are each connected via an optical circulator to the first and second sets of filters respectively, i.e. in a similar fashion to the third selective attenuator system of FIG. 6. In this system, the filters of each one of sets 1 to 4 are of the same type, i.e. with similar reflectivity characteristics, e.g. as illustrated in FIG. 3. Hence, in operation, signals passed by the first set of filters will pass via a first optical circulator to the third set of filters and that portion of the input signals reflected by the third set of filters will pass back through the optical circulator before continuing to second Mach Zehnder interferometer 56, 57. Second and fourth sets of filters will operate in an analogous manner. This seventh selective attenuator system provides all the advantages of the fourth system of FIG. 7 and the third system of FIG. 6.

In the arrangements of the fifth, sixth and seventh selective attenuator systems described above, the Mach-Zehnder interferometer could be replaced by one, or a combination of, Fabry-Perot etalons or similar.

Advantageously, the control of signal power level across a range of WDM signals is based on measurement of the power (or amplitude) of each of the signals. This can be carried out using suitable power/amplitude measurement means such as a commercially available spectrum analyzer. Alternatively the power/amplitude measurement means could comprise a dither modulator, photo-detector and narrow band filters as described next. Each signal entering an optical communications system or passing through a particular route therein could be modulated with a shallow dither amplitude modulation 'labelling tone' proportional to its optical power. Different tone frequencies could be assigned for each signal. The power levels of the various signals could then be derived from measuring the amplitudes of the respective dither signals present in the photocurrent of a single photo-detector. Electrical measurement of the strength of each dither signal may be achieved by means of a narrow-band filtering detection means. A set of control signals can be derived by computing the attenuation required to adjust each of the WDM signals to the required value, e.g. to equalize the power/amplitude of the set of WDM signals. The control signals are applied to actuators for providing the appropriate stimulus to each filter.

Figure 9:
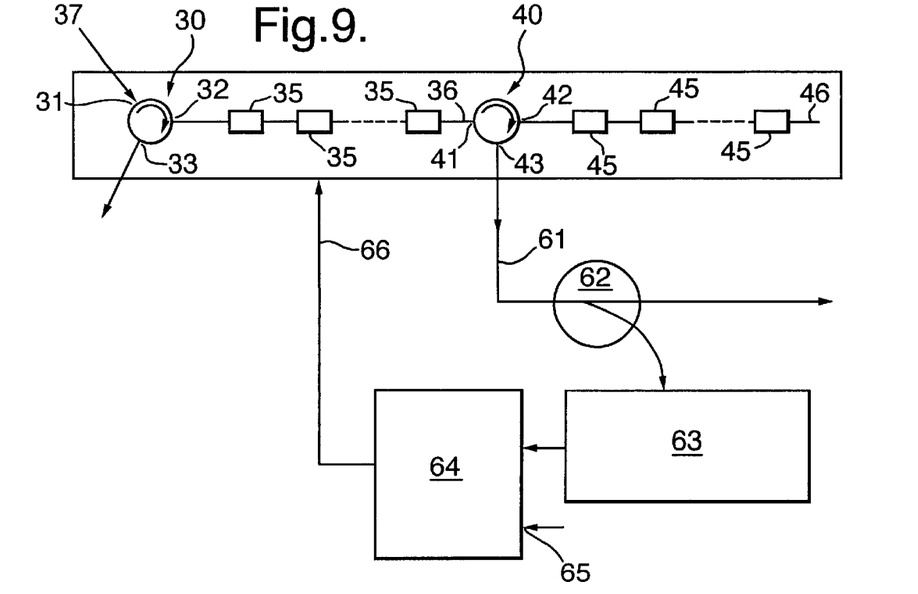
FIG. 9 shows a further system for use of a variable optical attenuator according to the present invention.

An eighth selective attenuator system according to the present invention is illustrated in FIG. 9. Features of FIG. 9 which are common with earlier figures are given the same reference numerals and will not be described further here. FIG. 9 shows an amplitude/power monitoring arrangement 62–66.

The signals passed by plurality of filters 35 and reflected by plurality of filters 45 are output from port 43 of optical circulator 40 and are guided in optical guide 61 to optical splitter 62 where they are split with a small, set proportion of each signal taken to power measurement unit 63. The remainder of the output signals continue along optical guide 61 and are thus output from the system. The power measurement unit 63 comprises power/amplitude measurement means as described above and provides information to control unit 64 on the power/amplitude of each of the measured signals.

The control unit 64 outputs control signals 66 to the filter tuning actuators (not shown) to create the required balance in attenuation between the two series of filters to give the desired power level for each WDM signal whilst minimizing power level distortion. Control input 65 to controller 64 allows for the operation of the controller to be inhibited.

Hence the arrangement of FIG. 9 provides the possibility of individually compensating for power level distortion introduced at the first series of filters 35 across the bandwidth of each WDM signal 37 with a complementary power level correction at the second series of filters 45.

Figure 10:
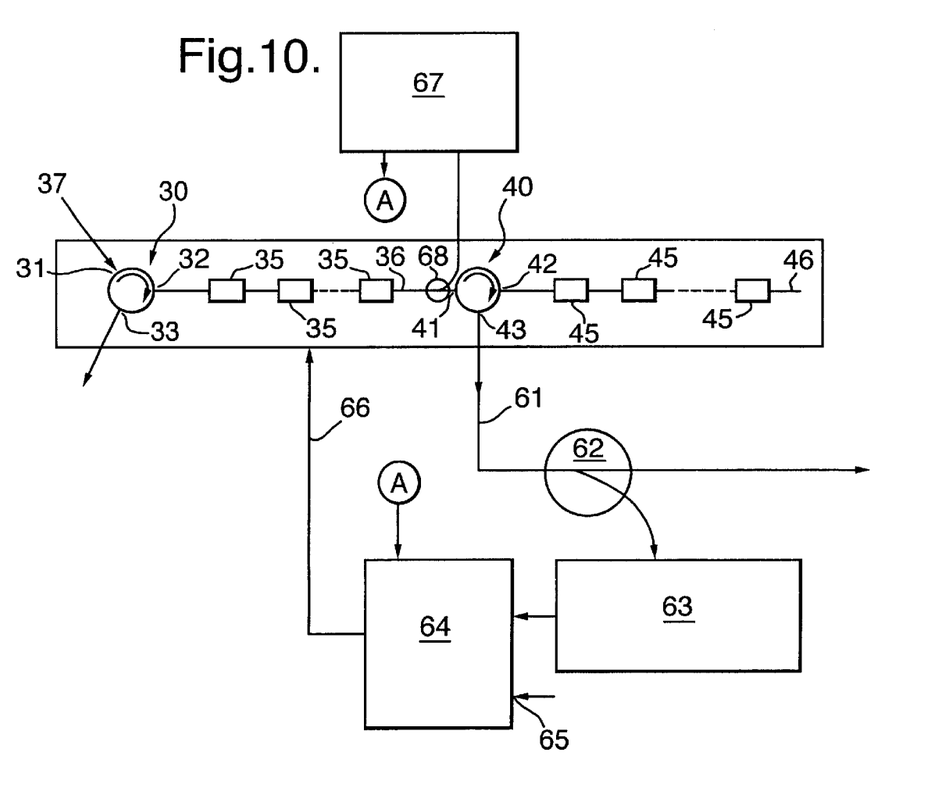
FIG. 10 shows a further system for use of a variable optical attenuator according to the present invention.

A ninth selective attenuator system according to the present invention is illustrated in FIG. 10. Features of FIG. 10 which are common with earlier figures are given the same reference numerals and will not be described further here. Comparing the arrangement of FIG. 10 with that of FIG. 9, second power/amplitude measurement unit 67 is connected via second optical splitter 68 to optical guide 36 at the end of first series of filters 35 adjacent optical circulator 40. Second optical splitter 68, acts to split the signals in optical guide 36 so that a small, set proportion of each signal is taken to power measurement unit 67 which may be similar to power measurement unit 63. The remainder of each signal continues along optical guide 36 to enter optical circulator 40 at port 41 thereof. Control unit 64 receives inputs from first and second measuring units 63, 67 thus receiving information on the power/amplitude of each of the measured signals at the end of the first series of filters and at the output. Hence the arrangement of FIG. 10 advantageously allows control of the filter activators based on information on the relative performance of each filter in each series. This allows the system to accurately control the performance of the filters of the first and second series even in the face of less than perfect filter actuators, e.g. demonstrating backlash. Control unit 64 compares values read from each series of filters against predetermined values and/or corresponding values from the other series of filters. It then computes what adjustments, if any, in actuator drive levels are necessary and sets those levels accordingly.

Figure 11:
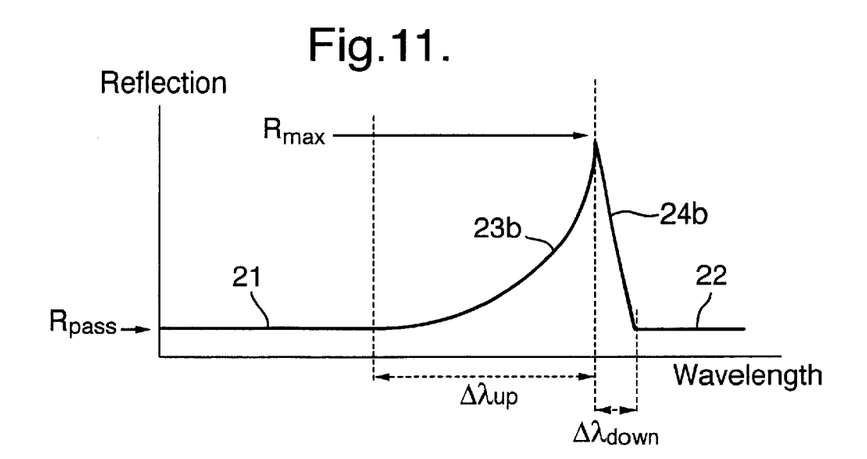
FIG. 11 shows the reflectivity characteristic of a third variable optical attenuator according to the present invention.

FIG. 11 shows the reflectivity characteristic of a third variable optical attenuator according to the present invention featuring lower and upper passbands 21, 22 (corresponding to reflectivity value $R_{pass}$) and in the reflection band a non-linear line segment 23b representing an increase in reflectivity with increasing wavelength from the passband value $R_{pass}$ to a maximum value $R_{max}$ and, continuing in the direction of increasing wavelengths a second line segment 24b in the reflection band indicating a rapidly declining value of reflectivity with increasing wavelength from the value $R_{max}$ back to the value $R_{pass}$. The first, non-linear line segment of the reflection band constitutes the active region of the attenuator characteristic, i.e., that part used to selectively attenuate optical signals. As can be seen from FIG. 11, the non-linear active region comprises both shallow gradient (low $dR/d\lambda$) and steep gradient (high $dR/d\lambda$) regions.

A tenth selective attenuator system according to the present invention will now be described with reference back to FIG. 7. Comparing the tenth selective attenuator system with the fourth selective attenuator system, already described above with reference to FIG. 7, it will be noted that FIG. 7 also shows first and second optical splitters 62, 68 and first and second power/amplitude measurement units 63, 67, as described above. First power/amplitude measurement unit 63 is connected via first optical splitter 62 to optical guide 46 at a position between optical circulator 70 and plurality of filters 45 so as to detect signals reflected at plurality of filters 45 back towards optical circulator 70. Second power/amplitude measurement unit 67 is connected via second optical splitter 68 to optical guide 36 at the end of first series of filters 35 adjacent optical circulator 70 so as to detect signals reflected at plurality of filters 35 back towards optical circulator 70. In operation, signals output from the system of FIG. 7 on optical guide 61 are those reflected by first plurality of optical filters 35, passed via optical circulator 70 to second plurality of optical filters 45, reflected by second plurality of optical filters 45 and passed via optical circulator 70 to third optical guide 61. Unreflected portions of the signals continue along optical guide 36 or 46 in the direction away from optical circulator 70 and may effectivity be discarded. Control unit 64 (not shown) receives and processes inputs from first and second measuring units 63, 67, and outputs control signals to the actuators (not shown) on the individual filters, as described above in relation to FIG. 10.

Figure 12:
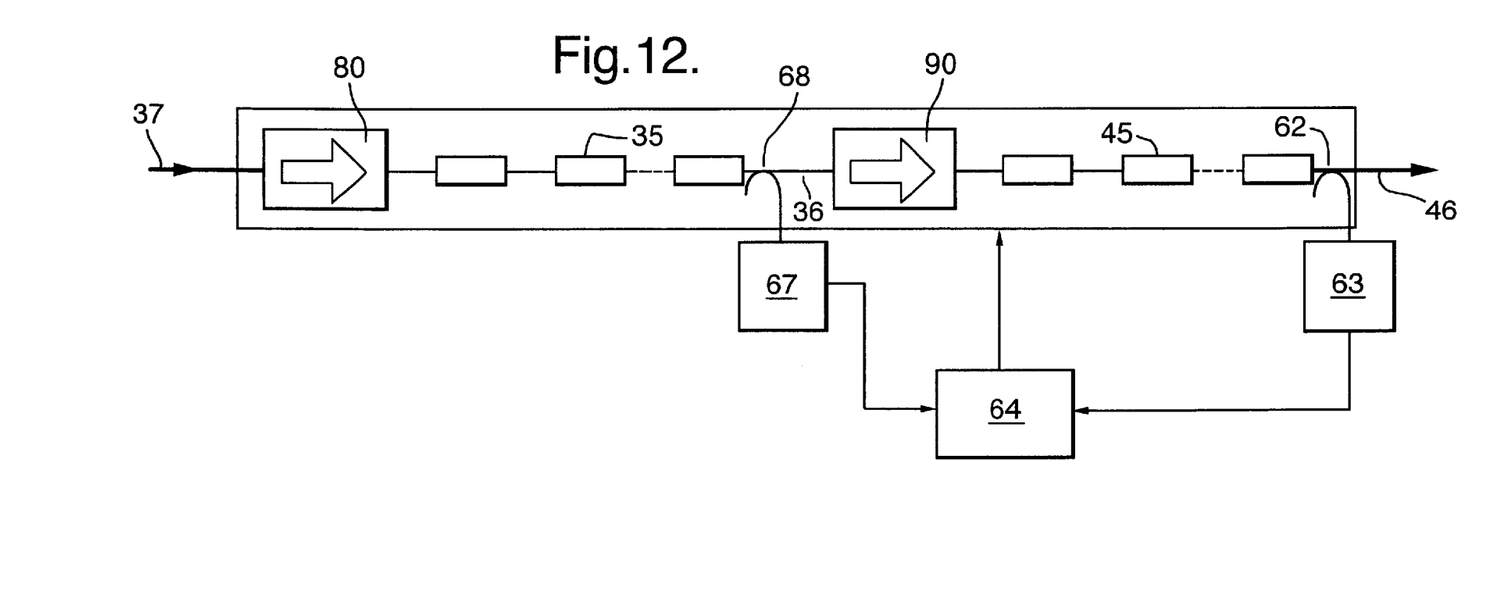
FIG. 12 shows a further system for use of a variable optical attenuator according to the present invention.

An eleventh selective attenuator system according to the present invention will now be described with reference to FIG. 12. FIG. 12 shows a monitoring and control arrangement similar to that shown in FIG. 10 and features common to FIG. 10 bear the same reference numerals and will not be described further here. The main difference between the systems of FIGS. 10 and 12 is that, in FIG. 12 optical circulators 30,40 have been replaced with optical isolators 80, 90. Hence optical signals 37 input to the system pass through optical isolator 80 into optical guide 36 and optical signals passed by plurality of filters 35 pass from optical guide 36 to optical guide 46 via optical isolator 90. As signals can only pass through optical isolators 80, 90 in one direction, the output from the system of FIG. 12 is derived from those signals passed by both pluralities of filters 35,45.

One problem experienced in optical communication systems is the wide variation in the propagation time or delay experienced by component parts of optical signals following routes through the network according to their wavelength. In addition, a similar chromatic distortion effect may be introduced into signals reflected at fibre Bragg grating filters in an optical communications system, as described below. This leads to a corresponding elongation or spreading of a transmitted data pulse as it passes through the network. In order to overcome this problem there is a need for a means to selectively introduce at a point in the network complementary delays into components of optical signals according to their wavelength.

The term chromatic dispersion is used here to indicate the undesirable effect where components of an optical signal following an optical path experience a differential delay according to their wavelength. Such dispersion is commonly introduced by conventional optical fibre. The chromatic dispersion D of an optical path, e.g. optical fibre, (i.e. the tendency of that path to introduce differential delay) may be expressed mathematically as $D = \Delta t / L . \Delta \lambda$, where $\Delta t$ is the differential delay introduced between a pair of optical signal components at a wavelength separation of $\Delta \lambda$ over a length L of the path. A typical value for D for optical fibre in use today is 16 pS/(nm.km).

A further effect of the fibre Bragg grating filters, as described above with reference to FIG. 2, is that they may introduce differential delays between components of a reflected optical signal. The introduction of unwanted differential delays will lead to chromatic distortion, as mentioned above. A grating with uniform effective period "s"

between lines will only reflect incident radiation whose wavelength corresponds to that effective period. In order to spread the reflection band of the grating to reflect more wavelengths, the effective period "s" between successive lines is varied along the grating. This variation in effective period "s" is called "chirp". Typically the effective period will get progressively shorter passing through the grating in one direction and longer in the other direction. The effective periodicity of the lines is calculated in relation to the physical spacing of the lines in combination with the effective speed of propagation of light in the medium, i.e. as determined by the refractive index of the medium and by the dimensions of an optical guide housing the grating. Hence the effective period may be arranged to vary despite equal line spacing by varying the refractive index of the grating medium and/or any variations in physical dimensions of the optical guide located in the grating region (e.g. the diameter of an optical fibre core or the width or depth of a waveguide).

This has the effect that incident light of different wavelengths will have to travel different distances through the FBG filter before reaching the appropriate effective period for that wavelength. Hence the path travelled by reflected light of a first wavelength through the FBG filter will be longer than the path travelled by reflected light of a different wavelength, leading to differential delay, i.e. an optical signal or component of a first wavelength following the longer path through the FBG filter will be delayed when compared with an optical signal or component of a second wavelength following the shorter path through the FBG filter.

According to a further preferred embodiment of the present invention, the selective attenuator systems according to the present invention and described above, in which output optical signals are reflected at optical filters, act to introduce differential delay between different wavelength components of the signals according to their wavelength. Advantageously, the series of filters are arranged so that the differential delay introduced is such as to correct chromatic distortion introduced as a result of the signal propagating through lengthy optical guides, e.g. in an optical communications network and/or, alternatively, chromatic distortion introduced by a further set of filters.

I claim:

1. A system for controlling the power levels of a first plurality of spectrally separated optical signals in a first optical path and of a second plurality of spectrally separated optical signals in a second optical path, the second plurality of optical signals forming a set with the first plurality of optical signals, the optical signals of the set being spectrally separated, the system comprising:
   a) optical attenuation means including a first plurality of optical attenuators in the first path, and a second plurality of optical attenuators in the second path, the second plurality of optical attenuators forming a first set with the first plurality of optical attenuators, each optical attenuator of the first set being operative for attenuating in a different part of a spectrum;
   b) a first optical guide in a shared part of the first and second paths; and
   c) a first interferometer for separating the second plurality of optical signals in the shared part of the first optical guide into a second optical guide of the second path, the first and second optical guides comprising the first and second pluralities of optical attenuators, respectively.

2. The system as claimed in claim 1, in which the signals of the first and second pluralities of signals that are spectrally adjacent to the signals comprised in the first plurality of signals are comprised in the second plurality of signals.

3. The system as claimed in claim 1, and further comprising a second interferometer for combining the signals passed by the first and second pluralities of optical attenuators into a single optical guide.

4. The system as claimed in claim 1, in which the optical attenuation means comprises a third plurality of optical attenuators, each optical attenuator of the third plurality for attenuating a different part of the spectrum; each optical attenuator of the third plurality for attenuating the same part of the spectrum as, and comprised in the same optical path as, a corresponding optical attenuator of the first plurality of optical attenuators.

5. The system as claimed in claim 4, in which the optical attenuation means comprises a fourth plurality of optical attenuators which form a second set with the third plurality of optical attenuators; each optical attenuator of the second set for attenuating a different part of the spectrum; each optical attenuator of the second set for attenuating the same part of the spectrum as, and comprised in the same optical path as, a corresponding optical attenuator of the first set.

6. The system as claimed in claim 5, and further comprising an optical circulator or optical isolator for passing the optical signals from each optical attenuator of the first set to the corresponding optical attenuator of the second set.

7. The system as claimed in claim 6, in which the optical circulator or optical isolator is operative for passing the optical signals to the first optical path.

8. The system as claimed in claim 1, in which each optical attenuator comprises a variable optical reflector.

9. A system for controlling the power levels of a first plurality of spectrally separated optical signals in a first optical path, the system comprising: optical attenuation means including a first plurality of optical attenuators in the first optical path, each optical attenuator of the first plurality for attenuating in a different part of a spectrum, and a further plurality of optical attenuators, each optical attenuator of the further plurality for attenuating a different part of the spectrum; each optical attenuator of the further plurality for attenuating the same part of the spectrum as, and comprised in the same optical path as, a corresponding optical attenuator of the first plurality of optical attenuators.

10. The system as claimed in claim 9, in which each optical attenuator comprises a variable optical reflector for controlling the power levels of signals passed by the respective optical attenuator; in which the reflectors of the first plurality of optical attenuators have reflectivity characteristics that comprise a first gradient in an active range, and in which the reflectors of the further plurality of optical attenuators have reflectivity characteristics that comprise a second gradient in the active range; and in which the first and second gradients are of opposite sign.

11. The system as claimed in claim 10, in which the reflectivity characteristic varies in a substantially constant fashion with wavelength.

12. The system as claimed in claim 10, in which the reflectivity characteristic varies in a non-linear fashion with wavelength.

13. The system as claimed in claim 10, in claim in which the reflectivity characteristic varies exponentially with wavelength.

14. The system as claimed in claim 10, in which each optical reflector comprises a tunable optical filter; and in which the reflectivity characteristic of the optical filter varies with wavelength.

15. The system as claimed in claim 9, in which each optical attenuator comprises a variable optical reflector for controlling the power levels of signals reflected by the respective optical attenuator; in which the reflectors of the first plurality of optical attenuators have reflectivity characteristics that comprise a first gradient in an active range, and in which the reflectors of the further plurality of optical attenuators have reflectivity characteristics that comprise a second gradient in the active range; and in which the first and second gradients are of opposite sign.

16. The system as claimed in claim 15, in which the reflectivity characteristic varies in a substantially constant fashion with wavelength.

17. The system as claimed in claim 15, in which the reflectivity characteristic varies in a non-linear fashion with wavelength.

18. The system as claimed in claim 15, in which the reflectivity characteristic varies exponentially with wavelength.

19. The system as claimed in claim 15, and further comprising means for selectively delaying components of an optical signal according to the wavelengths of the components.

20. The system as claimed in claim 9, in which each optical attenuator comprises a variable optical reflector, the optical reflectors of the first plurality of optical attenuators for controlling the power levels of signals passed by the respective optical attenuator; the optical reflectors of the further plurality of optical attenuating for controlling the power levels of signals reflected by the respective optical attenuator; in which the reflectors of the first plurality of optical attenuators have a reflectivity characteristic that comprises a first gradient in an active range, and in which the reflectors of the further plurality of optical attenuators have a reflectivity characteristic that comprises a second gradient in the active range; and in which the first and second gradients are of the same sign.

21. The system as claimed in claim 20, in which the reflectivity characteristic varies in a substantially constant fashion with wavelength.

22. The system as claimed in claim 20, in which the reflectivity characteristic varies in a non-linear fashion with wavelength.

23. The system as claimed in claim 20, in which the reflectivity characteristic varies exponentially with wavelength.

24. The system as claimed in claim 19, in which the optical signals are wavelength division multiplexed (WDM).

25. The system as claimed in claim 9, and further comprising signal level measurement means for measuring the power levels of the first plurality of signals in the first optical path, and in which the measurement means comprises a single photo-detector.

26. The system as claimed in claim 25, and further comprising modulation means for introducing a different characteristic modulation into each of the optical signals, in which the measurement means comprises means for measuring the amplitudes of the different characteristic modulations.

27. The system as claimed in claim 25, and further comprising control means for controlling the operation of the optical attenuation means based on measurement supplied by the measurement means.

28. The system as claimed in claim 9, for use as an optical communications system.

29. The system as claimed in claim 9, for use as a telecommunications system.

* * * * *